ID 19] United States Patent
Kuriyan

[11] Patent Number: 5,799,154
[45] Date of Patent: Aug. 25, 1998

[54] SYSTEM AND METHOD FOR THE REMOTE MONITORING OF WIRELESS PACKET DATA NETWORKS

[75] Inventor: George W. Kuriyan, Bridgewater, N.J.

[73] Assignee: MCI Communications Corporation, Washington, D.C.

[21] Appl. No.: 672,138

[22] Filed: Jun. 27, 1996

[51] Int. Cl.[6] .......................... H04Q 7/00; H04M 15/00
[52] U.S. Cl. ..................... 395/200.53; 395/200.54; 395/200.56; 395/182.02; 395/183.13; 395/184.01; 364/551.01; 364/264.4; 364/284.4; 364/919.4; 370/225; 370/333; 370/332; 379/133; 379/134; 455/453; 455/447; 455/466; 455/423
[58] Field of Search ................ 392/200.53, 200.54, 392/200.56, 180, 182.02, 183.13, 184.01, 601, 611, 613; 364/551.01, 242.94, 242.5, 264, 264.4, 266.5, 284.4, 919, 919.4; 370/319-322, 329, 331, 332, 333, 345, 346, 252, 431, 443, 913, 915, 902, 230, 232, 235; 379/59, 60, 58, 63, 49, 34, 111-115, 133-134, 350; 455/33.1-33.4, 54.1, 53.1, 67.1, 39, 49.1, 453, 447, 466, 446, 423

[56] References Cited

U.S. PATENT DOCUMENTS

| | | | |
|---|---|---|---|
| 3,866,185 | 2/1975 | Etra et al. | 701/117 |
| 4,866,710 | 9/1989 | Schaeffer | 370/330 |
| 4,974,256 | 11/1990 | Cyr et al. | 379/113 |
| 5,226,041 | 7/1993 | Waclawsky et al. | 370/236 |
| 5,239,673 | 8/1993 | Natarajan | 455/426 |
| 5,241,685 | 8/1993 | Bodin et al. | 455/453 |
| 5,274,841 | 12/1993 | Natarajan et al. | 370/337 |
| 5,280,630 | 1/1994 | Wang | 455/452 |
| 5,285,494 | 2/1994 | Sprecher et al. | 455/423 |
| 5,379,448 | 1/1995 | Ames et al. | 455/524 |
| 5,448,621 | 9/1995 | Knuden | 455/427 |
| 5,455,821 | 10/1995 | Schaeffer et al. | 370/332 |
| 5,475,868 | 12/1995 | Duque-Anton et al. | 455/62 |
| 5,504,938 | 4/1996 | Redden | 455/436 |
| 5,530,744 | 6/1996 | Charalambous et al. | 379/265 |
| 5,561,841 | 10/1996 | Markus | 455/446 |
| 5,612,948 | 3/1997 | Fette et al. | 370/252 |

*Primary Examiner*—Emanuel Todd Voeltz
*Assistant Examiner*—Tuan Q. Dam

[57] ABSTRACT

A system and method monitors a wireless network such that degradation of performance, as measured by such performance parameters as data throughput and service availability is estimated accurately on a real time basis. The system and method scan each cell in a wireless telecommunications network for cell statistics data. Using the scanned cell statistics data, the system and method generate a model of the performance of the telecommunications network by modeling each cell in the network. The model is based on a control system relationship. Using the control system relationship, the system and method forecast the performance of the cells between actual data collection times. Forecasting the state of the cells reduces the amount of data required to monitor the telecommunications network.

19 Claims, 7 Drawing Sheets

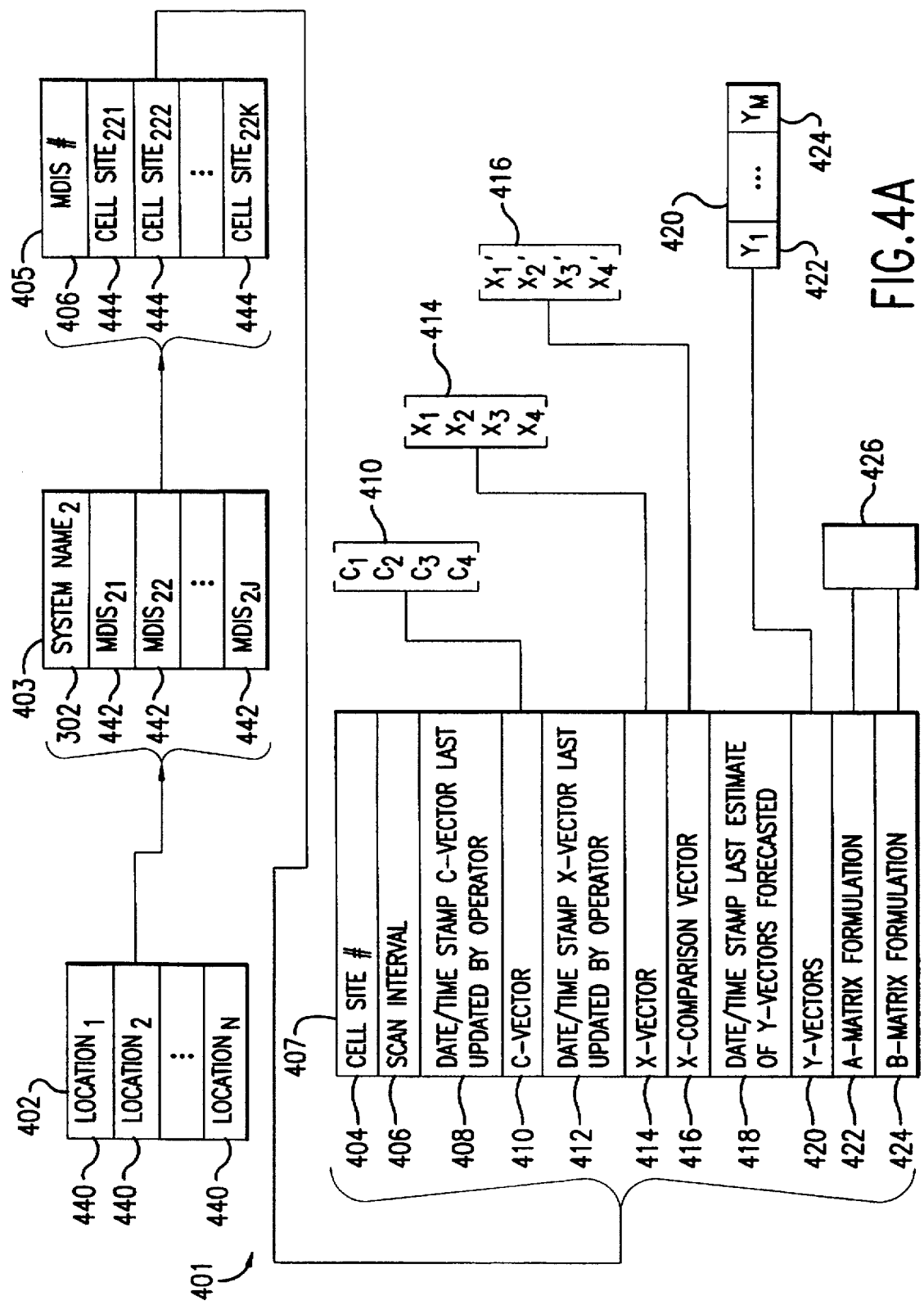

SYSTEM AND METHOD FOR THE REMOTE MONITORING OF WIRELESS PACKET DATA NETWORKS

BACKGROUND OF THE INVENTION

1. Field of the Invention

The present invention relates generally to network monitoring, whereby the state of networks as defined by key performance parameters can be assessed. More particularly, the present invention relates to the remote monitoring of wireless packet data networks and services.

2. Related Art

Widely used telecommunications services encompass large and often nationwide coverage. To provide such coverage, the service providers are often required to buy services from regional service providers. This is particularly true in cellular services where government regulations require that regional coverage in any specific area serving end users be provided by only two regional carriers. Therefore, nationwide cellular services can be achieved only through the resale of regional cellular services. Thus, the end user quality of the regional cellular networks through which cellular services are provided is a major concern for nationwide cellular service providers and resellers. Accurate measurement or monitoring of regional cellular network performance is a critical issue in such quality assessment.

Wireless packet data services are offered by cellular service providers as an overlay on existing cellular networks using a technology called Cellular Digital Packet Data (CDPD). CDPD technology is published through a CDPD Forum through formal specifications. The original specification—CDPD Specifications Version 1.0 was issued in May 1993, and was adopted by the CDPD Forum in June 1994 at the formation of the CDPD Forum and an independent industry forum. The technology was envisioned as a high-capacity cellular packet data network technology. The original specification required deployment of a CDPD base station in every cellular cell. In this manner, CDPD coverage could follow the footprint of the basic cellular coverage in a region and the quality of the CDPD network could closely match the quality of the underlying cellular network. Unfortunately, this type of CDPD deployment is too capital intensive for the start of CDPD service when the number of customers is expected to be low.

To remedy the capital expenditure requirement, the CDPD Forum, in January 1995, introduced the CDPD Specifications Version 1.1. Version 1.1 (i) reduced the capital requirements for the initial introduction of a CDPD network, and (ii) reduced the signal to noise interference to the underlying cellular system.

The CDPD Specifications Version 1.1 reduced the capital requirements and signal to interference ratio by (i) permitting deployments that did not conform with the frequency reuse pattern of the underlying system, and (ii) traffic management. Both of these types of controls can be accomplished dynamically in real time. However, such control can introduce degraded performance in a system with average traffic load and instability in system with heavy traffic load.

The version 1.1 standard provides greater flexibility in changing the configuration of the network to allow a network designer to respond to the dynamic telecommunications environment. For example, in the version 1.1 standard, network administrators can change cell coverage area and control handoff (transferring a call from one cell to another). The flexibility of version 1.1 allows reduced capital equipment deployment in telecommunications systems. For example, in CDPD networks designed according to the version standard, cell coverage area can be made larger, thereby reducing the amount of radio coverage equipment required to cover a particular region.

However, the greater flexibility also introduced a monumental monitoring problem. To understand the magnitude of the problem, consider that in a nationwide CDPD system, there are hundreds of regional CDPD Systems. Each of the regional CDPD systems can have over 900 sectorized cells. Version 1.1 provides the capability to individually change the operating parameters of each cell. In a fairly loaded system, these changes can adversely affect desired performance parameters of the system. Without a monitoring system, system users cannot be assured of performance without degradation—as measured by performance parameters including data throughput, CDPD channel availability, and CDPD channel reliability. However, merely providing a monitoring system can be a very expensive undertaking due to the large amount of data that has to be processed for each cell as indicated above for such a large number of cells. Thus, what is required is a monitoring system that can operate accurately, while simultaneously reducing data processing costs to an acceptable level.

SUMMARY OF THE INVENTION

The present invention is directed to a system and method for remotely monitoring several telecommunications systems. The system contains several functional modules coupled by a bus. The system includes a regional network scanning module coupled to the bus to scan a network for cell performance data. In addition, the system contains a performance modeling and forecasting module coupled to the bus. The performance modeling and forecasting module stores a model of the telecommunications network and generates a forecast of the model based on the scanned data. The system also includes a human interface and applications module that executes display applications for displaying the forecast.

In the preferred embodiment, the monitoring system is a control system model of a telecommunications network, e.g., a regional CDPD network. By modeling the telecommunications network according to control system theory, the storage and processing requirements for monitoring the network are reduced. This is because the state of the telecommunication network can be extracted from the model for times of interest that fall between measurement times. That is, the telecommunications network does not have to scan for cell performance data as often. Thus, less data is required to adequately monitor the telecommunications network.

The model of the present invention monitors various network performance related parameters to determine an overall network performance of the network. The overall network performance is viewed from the perspective of an end user. The performance related parameters that are monitored can be grouped in three primary categories: queuing data, signal coverage data, and layers of data transmission. The performance observed by the end user is a composite of these three primary categories of performance parameters.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein:

FIG. 4A is a preferred data structure for storing the model that is generated by the preferred embodiment of the present invention.

DETAILED DESCRIPTION OF THE PREFERRED EMBODIMENTS

The present invention is directed to a system and method for remotely monitoring performance parameters in a telecommunications network. The invention reduces data collection requirements by generating a network control model. Using the network control model, the invention forecasts network performance. After a dynamically modified collection interval has elapsed, the invention collects cell performance data to update the control model. The collection interval is modified in accordance with how much the collected cell performance data differs from predetermined thresholds.

Figure 1:
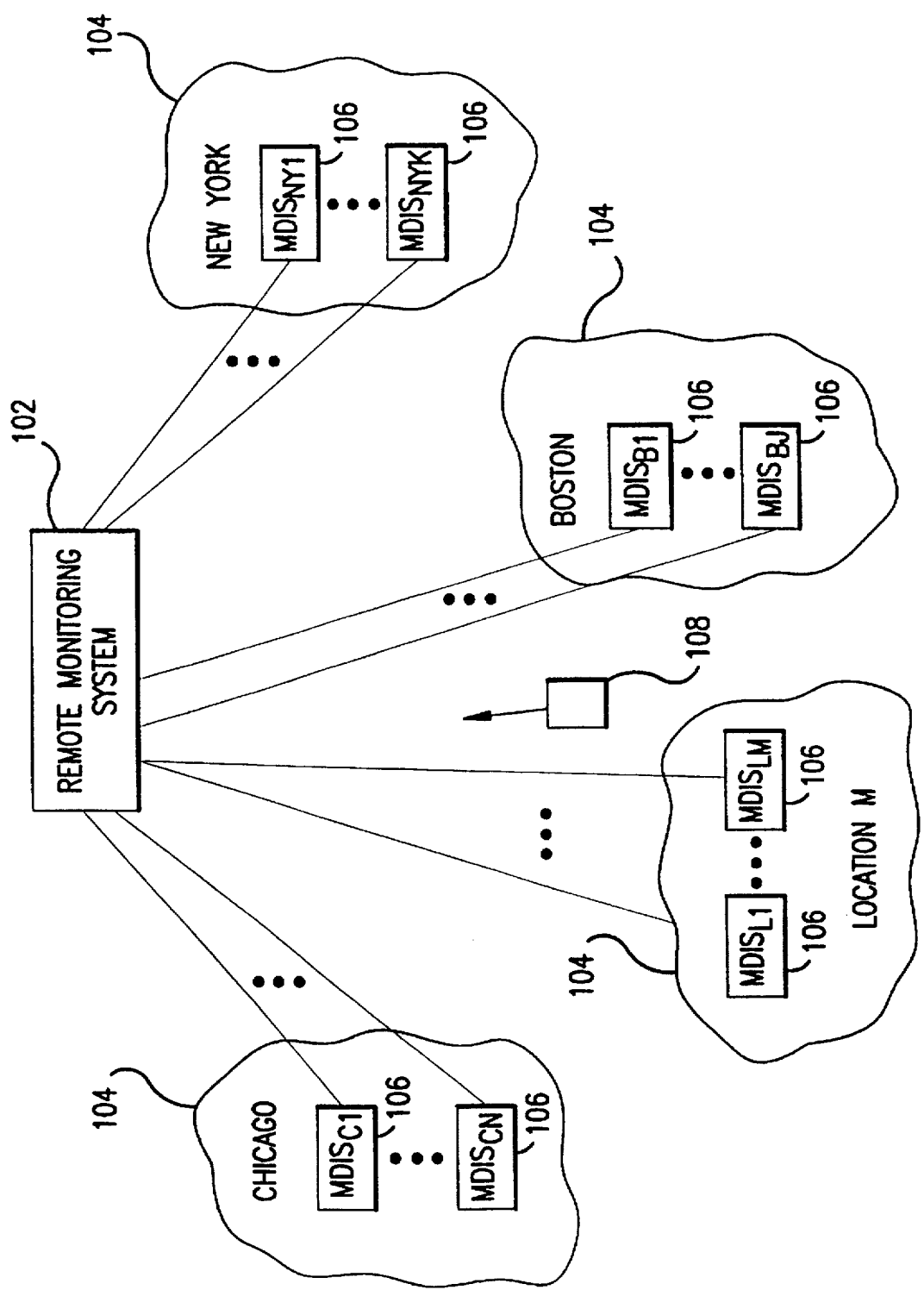
FIG. 1 is a preferred telecommunications system in which the present invention operates.

FIG. 1 illustrates a telecommunications network on which the present invention preferably operates. Referring to FIG. 1, the telecommunications network has one or more locations 104. Each location 104 has one or more mobile data intermediate systems (MDIS) 106. Each MDIS 106 handles one or more cells (not shown). Each cell handles one or more CDPD message transfers.

Each location 104 corresponds to a relatively large area in terms of number of users in the location 104. For example, the New York City location may not be as large in terms of area, but is large in terms of number of users. It would be apparent to those skilled in the art however, that area is a consideration in determining the boundary of a location 104.

Each MDIS 106 in each location 104 collects cell performance data from each cell (described below) in the MDIS 106. The MDIS 106 transmits the cell performance data to a central location in the telecommunications network. The data corresponds to various performance parameters for a given cell. In the preferred embodiment, the central location is a Remote Monitoring System (RMS) 102.

Each cell establishes a coverage area. Any mobile unit (end user) within a cell's coverage area can communicate with the cell. The cell's coverage area is determined by several factors including radiation power and radiation pattern. In the preferred embodiment, the cell's coverage area can be dynamically changed by modifying the coverage area factors. For example, if more users enter a particular cell, the cell's coverage area can be dynamically decreased, while increasing the coverage area of neighboring cells. By so modifying the coverage areas of the affected cells, call handling can be more evenly distributed across the telecommunications network.

Moreover, using the concept of "frequency reuse," a cell's effective coverage area can be modified. Frequency reuses either permits or prohibits adjacent cells from using the same frequencies. Frequency reuse is determined by factors including the modulation scheme employed in the telecommunications system, and the transmission power. The CDPD version 1.1 standard gives administrators of telecommunication network using CDPD modulation much greater freedom to vary cell coverage area to respond to network traffic changes. Managing this increase in flexibility in an efficient way to optimize the use of telecommunications resources is a potential use of the present invention.

Referring back to FIG. 1, each location 104 is coupled to a central remote monitoring system (RMS) 102. The system and method of the present invention reside in the RMS 102. In operation, therefore, the RMS 102 requests cell performance data from each cell in a particular location 104. The RMS 102 uses the cell performance data to create a model of the telecommunications network. Using the model the RMS 102 forecasts the state of the model at a future point in time. A network administrator, or network adaptation system, can use the forecasted state to update the network in response to changing network conditions.

Figure 6:
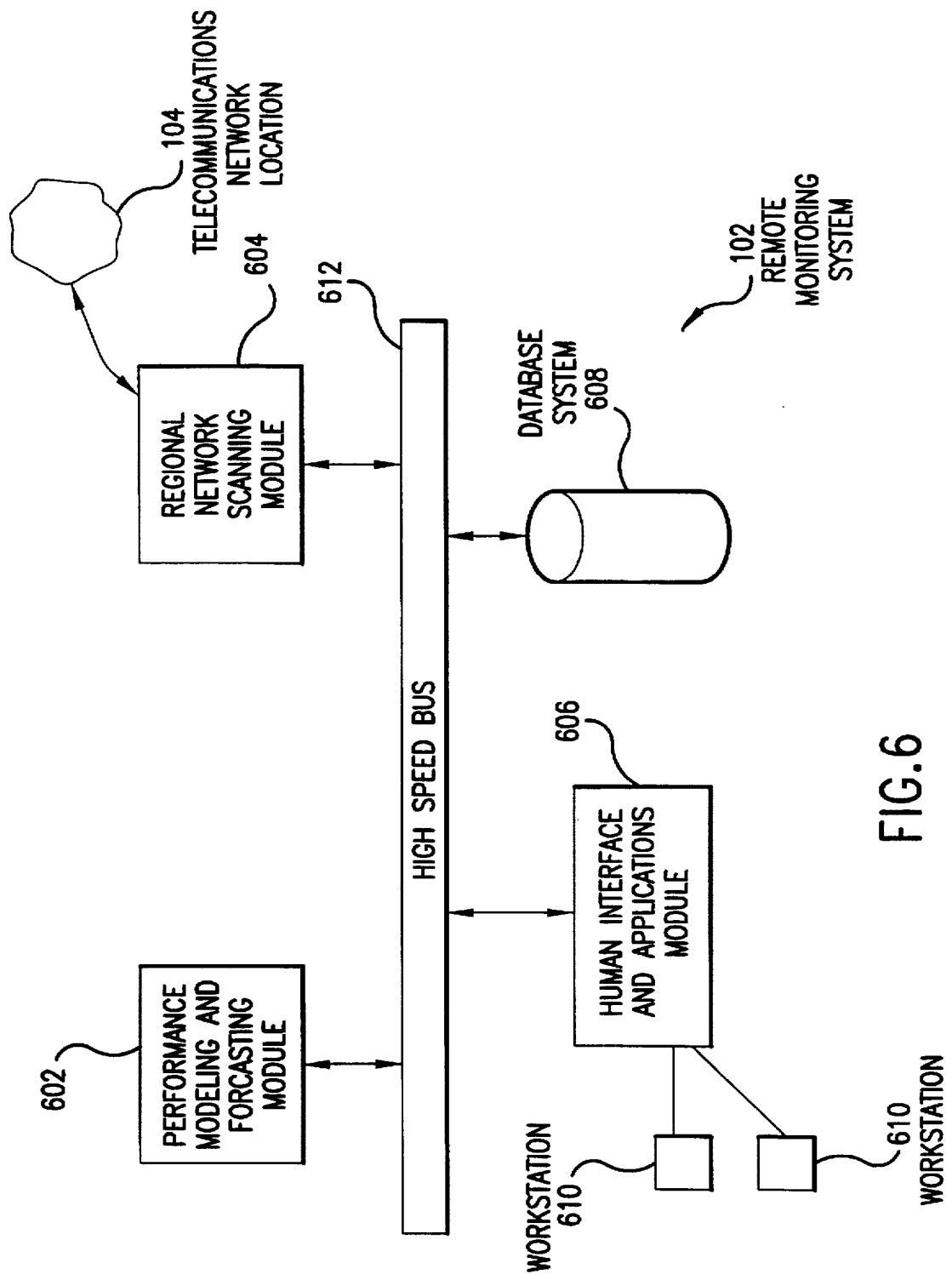
FIG. 6 is a preferred system of the present invention.

FIG. 6 illustrates an RMS 102 designed according to a preferred embodiment of the present invention. The RMS 102 includes a performance modeling and forecasting module (PMFM) 602, a remote network scanning module (RNSM) 604, a human interface and applications module (HIAM) 606, a database system 608, workstations 610, and a high-speed bus 612.

The PMFM 602 forecasts the state of a cell. According to a preferred embodiment, the PMFM 602 forecasts the state of a cell using control relationship described below. Using the forecasts, the PMFM 602 calculates a measure of the cell's performance. The RNSM 604 polls the cells in the locations 104. The polled data is stored in the database subsystem 608.

The HIAM 606 provides an administrator interface to the database subsystem 608. Network administrators access the HIAM 606 using the workstations 610. Allowing network administrators to access the database 608 greatly enhances the flexibility of the present invention. Using the HIAM 606, a network administrator has the power to modify and/or initialize any part of the database 608. Thus, the HIAM 606 provides a mechanism whereby the RMS 102 can be manually controlled, in addition to its automatic control.

The database subsystem 608 stores a unique record (described below) for each cell. Each record is a data structure describing characteristics of the cell. Communication between the PMFM 602, the RNSM 604, the HIAM 606, and the database subsystem 608 is provided by the high-speed bus 612.

Figure 2:
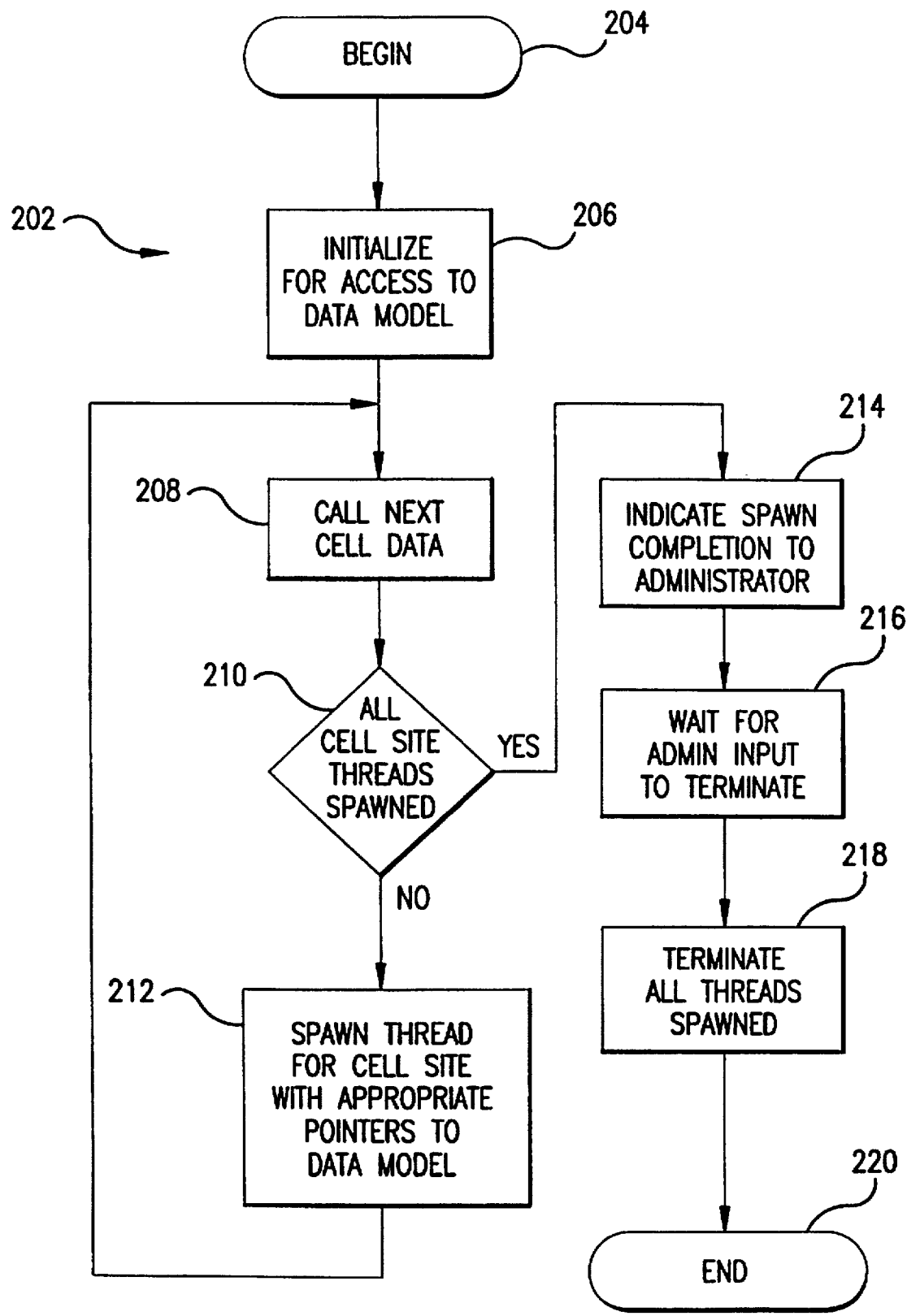
FIG. 2 is a preferred flow chart for cell performance data collection requests.

FIG. 2 is a flow chart for a method 202 for the operation of the RMS 102. As described above, the RMS 102 polls each cell in the telecommunications network to obtain cell performance data. Referring to FIG. 2, the method 202 begins in step 204 where method 202 immediately proceeds to step 206. In step 206, the RMS 102 is initialized to access a data model (described below) of the telecommunications network. Initialization of the RMS 102 includes performing such functions as initializing pointers to various parts of the data model, as well as, ensuring that sufficient computer resources are available for the large amounts of data that the RMS 102 collects.

Upon completion of initialization in step 206, the method 202 begins a loop comprising steps 208, 210 and 212. In step 208, the RNSM 604 polls the next cell to obtain cell performance data for that cell. Cell data includes the cell's coverage area (footprint), radiation power, radiation pattern, and cell location (latitude and longitude). In step 208, the RNSM 604 collects and stores cell performance data in the database 608. The retrieval and storage of cell performance data is accomplished by spawning a cell thread within the RMS 102 for each cell in the telecommunications network. The cell thread collects and stores the performance data in step 208. After storing the data, the RMS 102 determines, in step 210, whether all cell site threads (i.e., for all cells in the telecommunications network), have been spawned.

If threads have not been spawned for all of the cell sites, the method 202 continues in step 212. In step 212, the RMS 102 spawns a new thread corresponding to the next cell for which data must be collected. As part of the spawning process, the RMS 102 updates pointers to the data model as appropriate to ensure that the data is placed in the storage area corresponding to the cell for which the data is collected. The method 202 then continues in step 208, thereby completing the loop involving steps 208, 210, and 212.

If all of the cell site threads have been spawned, the RMS 102 performs step 214. In step 214, the RMS 102 provides an indication to a network administrator that threads for all of the cell sites in the telecommunications network have been spawned. The network administrator can take any required implementation dependent actions, such as modifying and/or supplementing collected values as the need arises. The network administrator accesses the data model via network workstations (described below). While the network administrator adjusts the recently collected model, the RMS 102 waits in step 216. When the network administrator is finished, the RMS 102 terminates all spawned threads in step 218. Operation of the RMS 102, according to the flow chart 202, is complete after step 218 is performed, as indicated by step 220.

Figure 3:
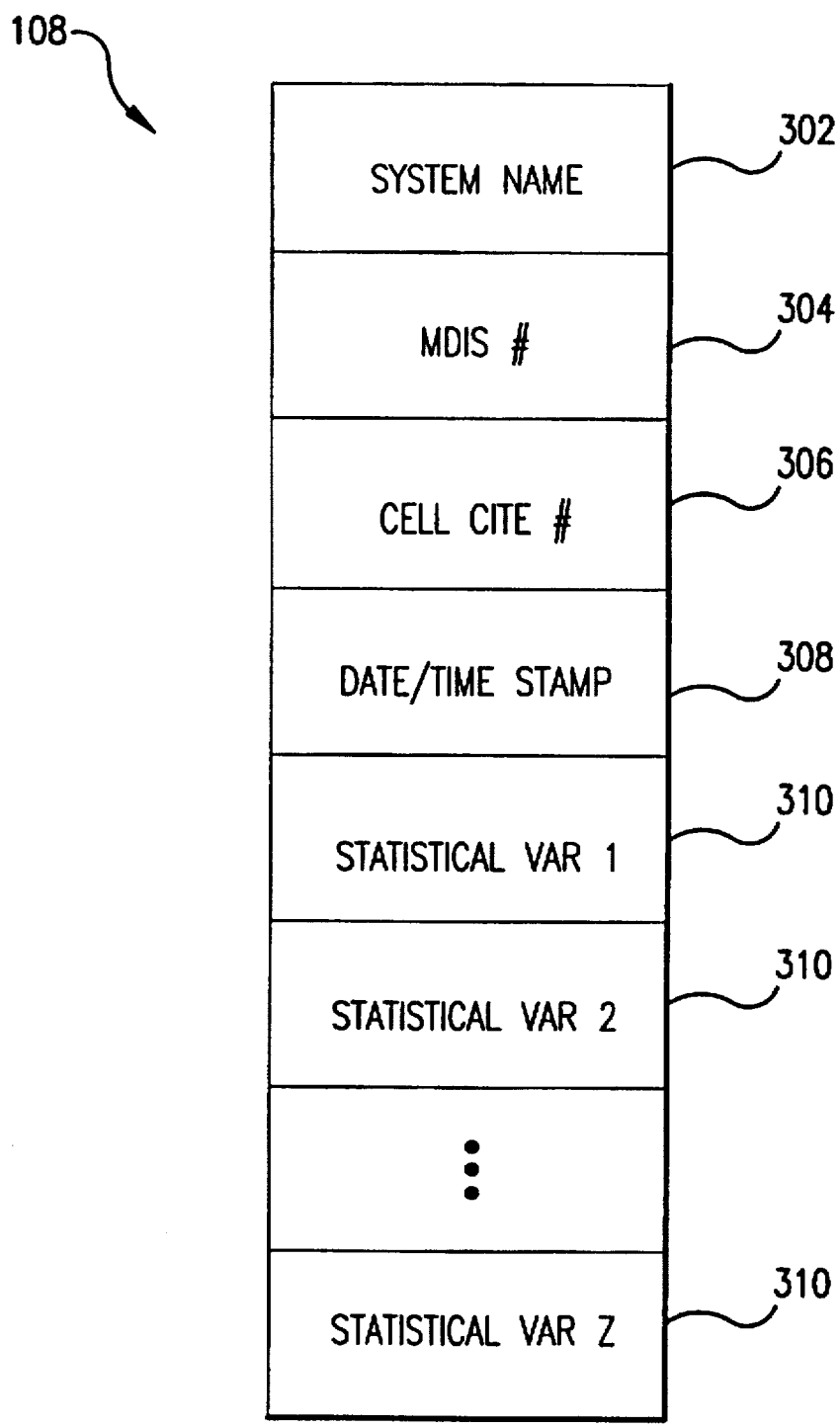
FIG. 3 is a preferred data structure for storing performance data for transmittal to a remote monitoring station.
Figure 4B:
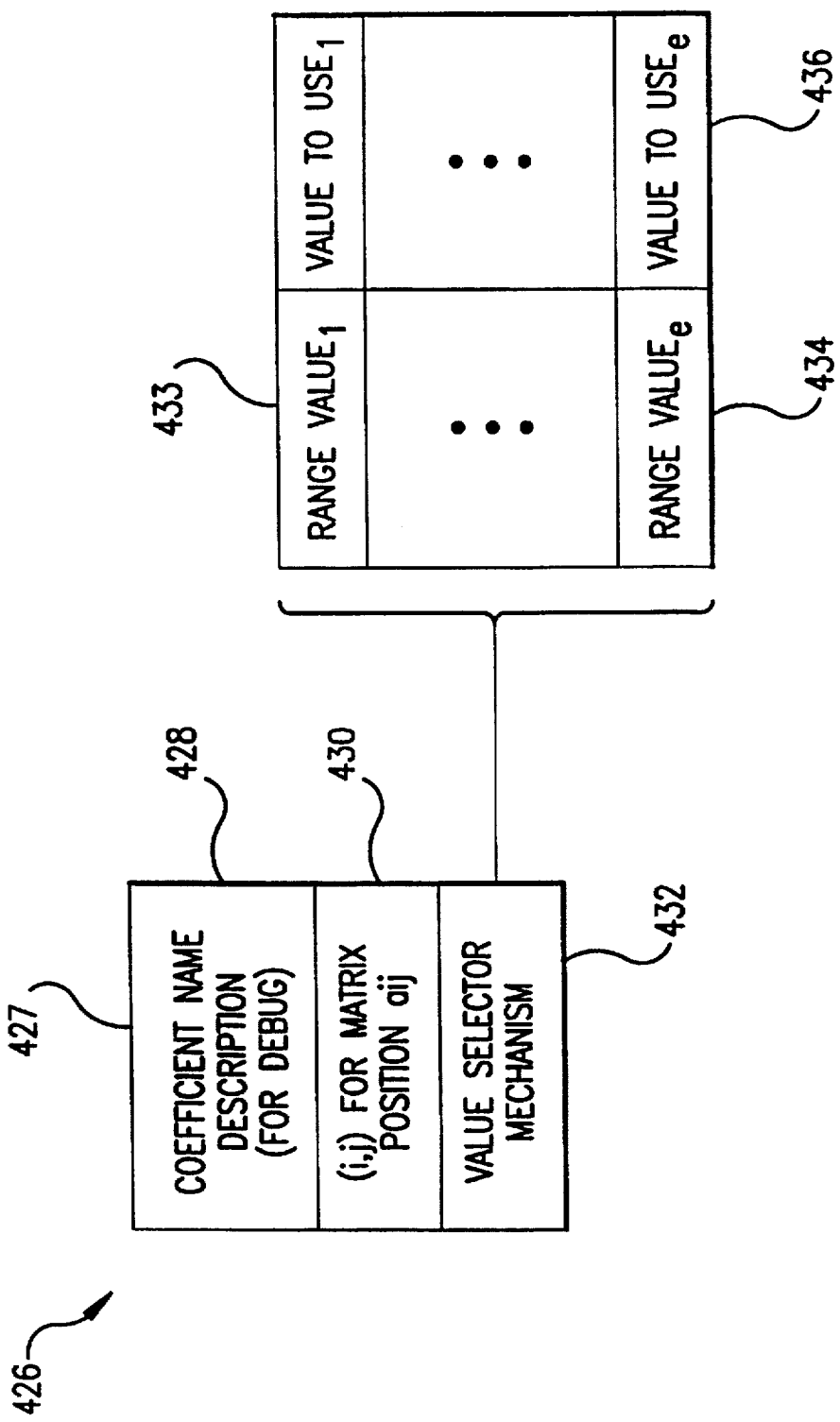
FIG. 4B is a preferred data structure that maps the cell performance data to an A-matrix and a B-matrix.

A preferred data model for use by the RMS 102 when operating according to the method 202 is presented in FIGS. 3 and 4A–B. The data model provides storage for cell performance data collected in step 208, calculated performance variables, transformation information, and general housekeeping data. The transformation data relates the input performance data collected in step 208 to the data model representation to forecasted performance variables that characterize the health of the network. The forecasted performance variables include data throughput (how much data is handled by the telecommunications network), CDPD availability, and CDPD reliability. The general housekeeping data includes data origination information, for example the particular MDIS in a given location, of the collected performance data.

Referring to FIG. 3, a preferred data structure 108 for conveying the collected cell performance data from the cell to the RMS 102 is illustrated. The data structure 108 includes a system name field 302, MDIS number field 304, cell site number field 306, date/time stamp field 308, and one or more statistical variable fields 310. The system name field 302 stores location information. The MDIS number field 304 stores the MDIS 106, that controls the cell, within the location 104. The cell site number field 306 is the particular cell from which the RMS 102 polled the cell data. The statistical variables 310 are the collected cell performance data.

FIGS. 4A–B illustrate a preferred data structure 401 for storing the cell performance data conveyed in the statistical variables 310 of the data structure 108. That is the data structure 401 stores the information conveyed in the data structure 108. Preferably, the data structure 401 is stored in the database subsystem 608. The data structure 401 is preferably a multidimensional array. The multidimensional array has multiple levels and multiple entries within each level. For example, at the highest level, the data structure 401 is an array of locations 402. Each entry 440 in the array of locations 402 corresponds to a location 104. Each location entry 440 contains an array of MDISs 403.

The array of MDISs 403 stores a system name 302, corresponding to the location 104 for the location entry 440. In addition, information corresponding to each MDIS 106 in a location 104 is stored in a separate entry 442. Thus, the array of MDISs 403 corresponds to a particular location entry 440 in the array of locations 402. In the preferred embodiment, the first subscript denotes location number, and the second subscript denotes an MDIS number with the particular location. Each MDIS entry 442 contains a cell site array 405.

The cell site array 405 stores information for all of the cells corresponding to a particular MDIS 106. The information is stored in cell site entries 444. The particular MDIS is identified in an entry 442 of the MDIS array 403. In the preferred embodiment, the first subscript denotes the location entry 440 in which the cell site entry 444 is stored. The second subscript references the MDIS entry 442 that stores the cell site entry 444. The third subscript corresponds to the particular cell site entry 444 in the MDIS entry 442. Each cell site entry 444 stores a cell site data structure 407.

The cell site data structure 407 stores all of the cell site data for a particular cell in the telecommunications network. In the preferred embodiment, a unique one cell site data structure 407 corresponds to each and every cell in the telecommunications network. In a network having a large number of cells, the information storage requirements are unmanageable if no data reduction method is performed. The present invention performs data reduction by forecasting the state of the telecommunications network between sampling times, rather than performing the higher rate sampling of conventional systems.

The cell site data structure 407 contains the cell site number 404 to which the cell site data structure 407 belongs. The cell site data structure 407 contains a scan interval 406. The scan interval 406 is the interval of time between successive cell data collections in step 208. Because the scan interval 406 is stored in the cell site data structure 407, the scan interval is unique to a particular cell. Thus, the present invention provides a mechanism for non-uniform scanning of cells. That is, by setting the scan interval 406 independently for each cell site 404, not all cells in the telecommunications network are polled by the RMS at the same rate.

The cell site structure contains a C-vector 410. The C-vector 410 is a vector of constants or operator actions that are added to a control equation (described below) to account for a constant or operator actions. The operator actions include operator changes to signal strength and operator changes to the number of subscribers that can be logged. Use of such vectors is well known in the art. In addition, the C-vector 410 has a date/time stamp 408 of the last update of the C-vector 410. The present invention provides flexibility by allowing the C-vector 410 to be automatically or manually updated. For example, an automatic update can occur at system startup to initialize all value to zero. Alternatively, the network administrator can update the C-vector 410 for a particular cell-site manually. The date/time stamp 408 keeps a record of the time of the last update to the C-vector 410.

The cell site structure also contains an X-vector 414. The X-vector 414 is the collected cell performance data 310 conveyed to the data model 401 by the data structure 108. In addition, the X-vector 414 has a date/time stamp 412 of the last update of the X-vector 414. The present invention provides flexibility by allowing the X-vector 414 to be automatically or manually updated. For example, an automatic update can occur at system startup to initialize all values to zero. Alternatively, the network administrator can update the X-vector 414 for a particular cell-site manually. The date/time stamp 408 keeps a record of the time of the last update to the X-vector 414.

In addition, the cell site data structure 407 contains an X-comparison vector 416. The X-comparison vector 416 is a vector of thresholds. If any of the cell data exceeds its corresponding threshold, the scan interval 406 for the cell is adjusted accordingly. The adjustment is preferably automatic as described below. The present invention provides flexibility by identifying a unique X-comparison vector 416 for each cell site 404.

The cell site structure also contains a Y-vector 420. The Y-vector 420 is a vector of forecasts of the state of the network at a particular time. The network administrator uses the Y-vectors to ensure that the telecommunications network is healthy. Normal values of the Y-vectors indicate that the network is healthy. Abnormal values of the Y-vector can require the network administrator to take corrective action. In addition, the Y-vector 420 has a date/time stamp 418 of the last update of the Y-vector 420. The present invention provides flexibility by allowing the Y-vector 420 to be automatically or manually updated. For example, an automatic update can occur at system startup to initialize all value to zero. Alternatively, the network administrator can update the Y-vector 420 for a particular cell site manually. The date/time stamp 418 keeps a record of the time of the last update to the Y-vector 420.

The Y-vector 420 contains a history of Y-vectors. That is, the Y-vector 420 contains a set of M Y-vectors, where M is the size of the history. For example, if the Y-vector history time is a day, and the scan interval 406 is an hour, 24 Y-vectors (one per hour) are saved in the Y-vector 420. The oldest component Y-vector 424 is designated YM. The most recent component Y-vector 422 is designated $Y_1$. The designations are arbitrary and are provided solely for convenience in explanation. When the Y-vector array 420 is full a subsequent Y-vector calculation replaces the oldest component Y-vector 424 in the Y-vector array 420.

The cell site date structure 407 contains two additional matrices. The first matrix is termed the A-matrix 422. The A-matrix 422 is a transformation matrix that uses the cell data stored in the X-vector 414 to forecast the state of the telecommunications network according to a control relationship described below. The second matrix is termed the B-matrix 424. The B-matrix 424 determines the memory of the control system. That is, the B-matrix 424 scales the historical values of the Y-vector and adds them to the forecast resulting from the application of the A-matrix 422 to the X-vector 414. For example, if the B-matrix 424 is set to zero, the control system has no memory. In such a case, the past forecasts of the system have no effect on the current forecast. As elements in the B-matrix 424 approach 1, there is more memory in the control system. That is, the historical values of the Y-vector have a greater effect on the current value of the Y-vector. In the preferred embodiment, elements in the B-matrix 424 are set independently between 0 and 1, depending on the desired memory of the control system.

In the preferred embodiment, the A-matrix 422 and B-matrix 424 are generated in the same manner. Referring to FIG. 4B, the method for generating the A-matrix 422 is explained. A coefficient generation vector 427 includes a coefficient name description for each coefficient in the A-matrix 422. The coefficient generation matrix 427 also contains the positions 430 for each coefficient in the A-matrix 422. In addition, the coefficient generation matrix 427 contains a value selector mechanism 432. The coefficient generation matrix 427 is preferably stored in the database 608.

The value selector mechanism 432 is any mechanism for mapping the value of a coefficient in the A-matrix 422 to a new value, such that the new value performs the desired transformation. In the preferred embodiment, the mapping is performed by sorting the X values received from the cell. The A-matrix 422 is then generated by determining where a received X value falls within a range of values. The range limits are given in the left column 434 of a mapping matrix 433. The value to use in the A-matrix 422 is given in the right column 436 of the mapping matrix 433. This sorted X value is used to determine each value in the A-matrix 422. It would be apparent to those skilled in the art that the aforementioned generation of the A-matrix 422 is but one mapping function and that others are possible within the scope and spirit of the present invention. As previously mentioned, the B-matrix if formed in an analogous manner.

Figure 5:
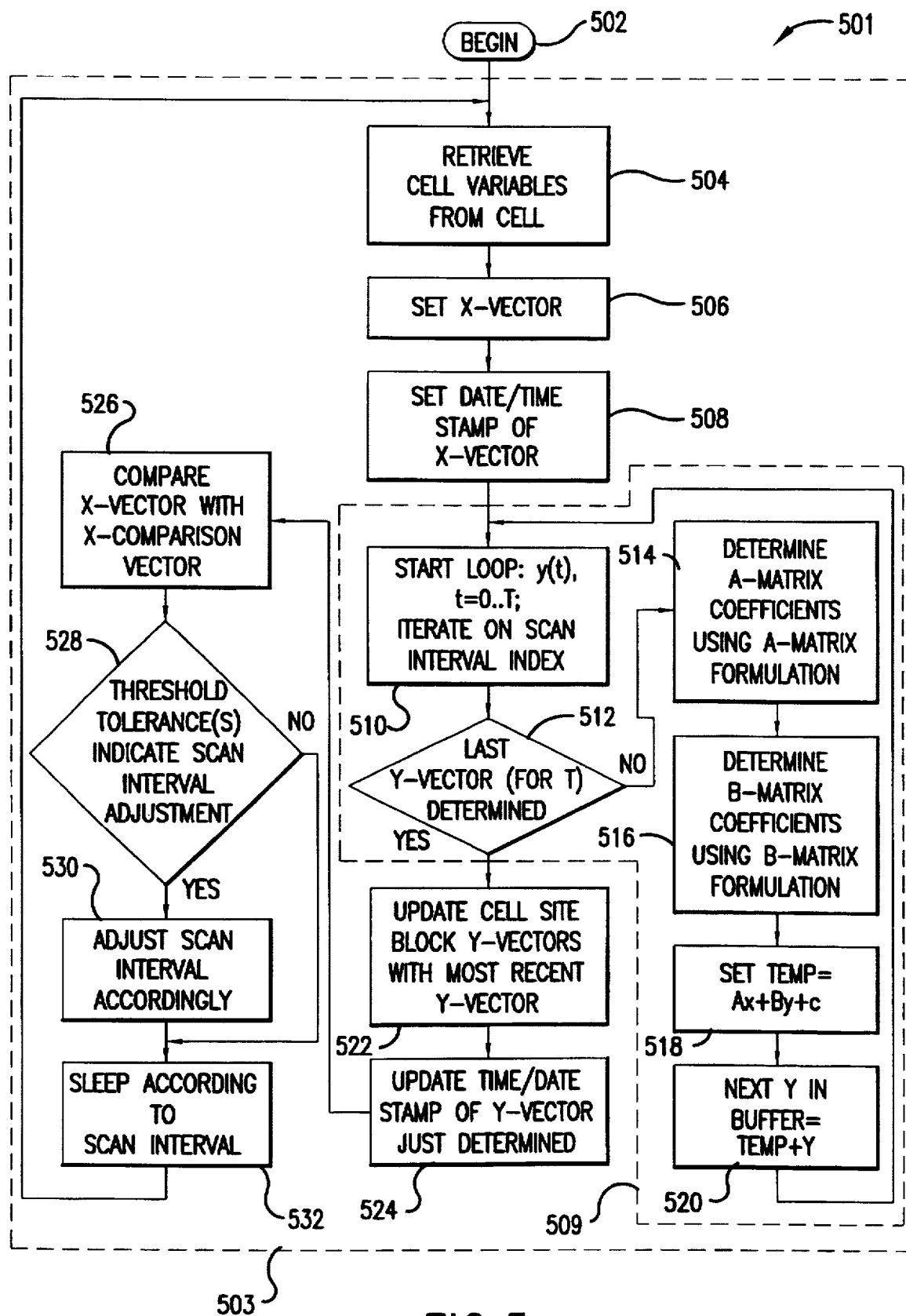
FIG. 5 is preferred flow chart for updating the model generated by the preferred embodiment of the present invention, and modifying a scan interval.

Having described the data structure 401 in which the present invention stores a network model, and the quantities required to enable the model, the method for using the data structure to forecast the state of the telecommunications network is disclosed. A method 501 for using the data model 401 in the preferred embodiment is given in FIG. 5. FIG. 5 is a more detailed illustration of the steps 208, 210, and 212 illustrated in FIG. 2. According to the preferred embodiment, the method 501 uses the cell performance data polled by the RMS 102 to generate a forecast for the state of a particular cell in the network. The forecast is modeled using the control relationship described below. The RMS 102 spawns a process, called the spawned process, that executes the method 501 for each cell in the telecommunications network.

Referring to FIG. 5, the method 501 begins in step 502, in which the RMS 102 spawns a particular cell site thread to collect data for a particular cell. The particular cell site thread is the spawned process for the particular cell. The method then proceeds to step 504 where it enters a loop 503. Loop 503 includes steps 504–532. In loop 503, PMFM 602 performs various forecasting functions during a scan interval. At the end of the scan interval, PMFM 602 determines if the scan interval needs to be adjusted. In step 504, the RNSM 604 retrieves cell variables from the cell. Using the retrieved data, the RNSM 604 sets the X-vector 410 in step 506 and stores the X-vector in the database 608. In addition, the RNSM 604 sets the date/time stamp 412 of the X-vector 410 with the time of this most recent access of the X-vector 410.

The method then enters a loop 509. Loop 509 includes steps 510–520. Loop 509 is a loop nested within loop 503. The PMFM 602 in loop 509 forecasts the state of the cell without polling for additional data. That is, the forecast is an estimate of the state of the cell based on past cell behavior. The past cell behavior is based on prior actual collected data, as well as prior estimates.

The first step in loop 509 is step 510. In step 510, the PMFM 602 initializes the loop so that time to corresponds to the time of the last data collection from the cell. In loop 509, time is incremented according to a time interval that is shorter than the scan interval. The time interval is arbitrary and need not be periodic. Time is incremented in the time interval until the scan interval time, T, has elapsed. The operation of the PMFM 602 exits the loop 509 when the RNSM 604 is ready to perform the next data scan.

The method 501 continues loop 509 at step 512. In step 512, the PMFM 602 determines whether the scan time interval, T, has elapsed. The Y-vector calculated at time T is termed the last Y-vector. If the last Y-vector has not been determined, the method 501 continues at step 514. In step 514, the method 501 calculates the A-matrix 422 as described above. The method 501 continues in step 516 where the PMFM 602 calculates the B-matrix 424 as described above.

The method 501 continues at step 518. In step 518, the PMFM 602 forecasts the value of the Y-vector at a some time since the last data scan. In the preferred embodiment, the Y-vector is iteratively determined according to the control relationship:

$$\frac{dY}{dt} = AX + BY + C \quad (1)$$

where Y is a Y-vector at a time t corresponding to the time since the last data scan, A is the A-matrix 422, B is the B-matrix 424, C is the C-vector 410, and X is the X-vector 414. Equation (1) provides the incremental change in the Y-vector since the prior estimate. In step 520, the PMFM 602 adds the incremental adjustment to the Y-vector for the current iteration through loop 509 to a running forecast of the Y-vector. The Y-vector resulting from the addition in step 520 is the forecasted state of the network at a time after the last scan interval. After the addition in step 520, operation of the PMFM 602 continues the loop 509 at step 510 using the next time t.

If the PMFM 602 in step 512 indicates that the last Y-vector had been processed, the PMFM 602 updates the cell site Y-vectors array 420 in step 522. In the preferred embodiment, the update appends the most recent Y-vector to the front of the Y-vector array 420. The method 501 then continues at step 524 where the PMFM 602 updates the date/time stamp 418 for the last Y-vector, that is, the most recently determined Y-vector.

According to a preferred embodiment, a history of the Y-vectors is stored in the Y-vector array 420. Generally, the history corresponds to the Y-vectors corresponding to data scans. However, in an alternative embodiment, the history includes Y-vector forecast estimates.

After updating the Y-vector, the PMFM 602, in step 526, determines whether the scan interval 406 requires adjustment. Preferably, the determination is made automatically. To determine whether the scan interval 406 needs to be adjusted, the PMFM 602 compares the X-vector 414 to the X-comparison vector 416 in step 526. The X-comparison vector 416 is a vector of thresholds. The thresholds are predetermined tolerances. The collected data is compared to the predetermined tolerances to assure that the cell is operating as desired. The data scan interval 406 is adjusted, preferably automatically, depending on the result of the comparison. If the comparison in the step 528 indicates that the threshold is exceeded, there is a potential malfunction of the cell. As a result, the scan interval 406 is shortened in step 530 so that a network administrator can monitor the cell more closely. If the cell continues to exhibit signs of malfunction, the network administrator can take corrective action.

If the PMFM 602 in step 528 indicates that the predetermined tolerances have not been exceeded, the method continues in step 532. Alternatively, if the PMFM 602 in step 530 indicates normal operation, the scan interval can be increased. In a preferred embodiment, the scan interval can be increased beyond the nominal initialization value for the scan interval. In the preferred embodiment, a maximum and minimum scan interval are established. In the preferred embodiment, the scan interval cannot exceed the maximum scan interval and cannot be shorter than the minimum scan interval. For example, if the comparison indicates that the cell is outputting more power than a predetermined amount, the scan interval for that cell is shortened. As a result, the Y-vector data that is produced by Equation (1) more accurately represents the actual physical state of the network.

To keep the amount of data collected as small as possible, the scan interval is cell dependent. That is, not all cells necessarily have the same scan interval. Thus, when one cell's scan interval is shortened, the other cells' scan intervals are unaffected. Thus, only the one cell collects data at a higher rate than the nominal collection rate set at initialization.

If the scan interval 406 requires adjustment, the PMFM 602 so adjusts the scan interval in step 530. As described above, the PMFM 602 can increase or decrease the scan interval. In the preferred embodiment, the scan interval adjustment is automatically done by the PMFM 602. After making the necessary adjustments to the scan interval 406, or if the scan interval 406 does not require adjustment, the PMFM 102 enters a "sleep" mode in step 532. In the "sleep" state, the RMS 102 waits idly for the next scan interval 406 to begin. Upon the invocation of the next scan interval 406, the RMS 102 completes loop 503 by continuing the method 501 in step 504.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for remotely monitoring the performance of a telecommunications network having at least two cells, comprising the steps:

collecting performance data for each cell wherein said data is functionally related to performance parameters in each cell;

creating a unique cell data structure for each cell, wherein each cell data structure includes a unique scan interval;

forecasting, independently, a state of each cell, for future points in time during each cell's said unique scan interval, based on data collected prior to said unique scan interval and on prior forecasts, without collecting additional data during said unique scan interval;

comparing, independently, said collected data from each cell, to predetermined thresholds; and modifying, independently, each unique scan interval in response to said comparing step, whereby the modification of one cell's unique scan interval does not affect the modification of another cell's unique scan interval.

2. The method recited in claim 1, wherein said modifying step includes the steps of:

shortening said unique scan interval when said predetermined thresholds are exceeded; and increasing said unique scan interval when said predetermined thresholds are not exceeded.

3. The method of claim 1, wherein each unique cell data structure includes:

a vector of said collected cell performance data;

a vector of predetermined thresholds;

a vector of forecasts of a state of the network at a particular time, wherein said vector of forecasts includes a history of forecasts; and a transformation matrix that uses cell data stored in said vector of collected cell performance data to forecast the state of the network according to a control relationship.

4. The method of claim 3, wherein each unique cell data structure further includes:

a scaling matrix that scales said history of forecasts and adds them to a forecast resulting from application of said vector of said collected cell performance data to said transformation matrix.

5. A method for remotely monitoring the performance of a telecommunications network, comprising the steps of:

collecting, prior to and after a scan interval, performance data functionally related to performance parameters in the network;

generating a network control model of the performance of the network using said data collected prior to said scan interval; and forecasting the performance of the network at a future point in time during said scan interval, using said network control model, whereby a monitored performance of the network during said scan interval is an estimate based on data collected prior to said scan interval in said collecting step and prior forecasts determined in said forecasting step.

6. The method recited in claim 5, further comprising the steps of:

comparing said collected data to predetermined thresholds; and adjusting a duration of said interval in response to said comparing step.

7. The method recited in claim 5, further comprising the steps of:

generating said network control model in accordance with a control relationship; and forecasting the performance of said network by forecasting a new performance as the result of application of said control relationship to said data.

8. The method as recited in claim 5, wherein the telecommunications network includes one or more cells and said collecting step comprises the steps of:

polling the one or more cells for said data;

creating a data structure for each cell;

transmitting said data to a central location in response to said polling; and for each data structure, storing said data polled from each cell.

9. The method as recited in claim 8, further comprising the step of:

spawning a thread for each of the one or more cells, said thread to perform said polling and collecting steps.

10. The method as recited in claim 9, further comprising the steps of:

(a) generating an A-matrix;

(b) generating a B-matrix;

(c) setting a temporary vector equal to AX+BY+C, where X is a vector corresponding to said data, Y is a vector corresponding to previous estimates of the performance of the network, and C is a vector of constants operator actions;

(d) updating a forecast of the performance of the network by adding said temporary vector to a previous estimate of the performance of the network; and (e) repeating steps (a)–(d) one or more times during said scan interval.

11. A system for remotely monitoring the performance of a telecommunications network, comprising:

a regional scanning module for collecting, prior to and after a scan interval, performance data functionally related to performance parameters in the network; and a performance modeling and forecasting module for generating a network control model of the performance of the network using said data collected prior to said scan interval and for forecasting the performance of the network at a future point in time, using said network control model, whereby a monitored performance of the network during said scan internal is an estimate based on data collected prior to said scan interval in said collecting step and prior forecasts determined in said forecasting step.

12. The system as recited in claim 11, wherein the telecommunications network includes one or more cells for handling calls, the system further comprising a database system for storing said performance data collected from each cell in a data structure created for each cell.

13. The system as recited in claim 12, further comprising:

a workstation;

a database system for storing said collected performance data; and means for allowing a network administrator access to said database system by using said workstation.

14. The system as recited in claim 11, wherein said performance modeling and forecasting module further comprises:

comparing means for comparing said collected data to predetermined thresholds; and modifying means for adjusting a duration of said scan interval in response to said comparing means.

15. The system as recited in claim 11, wherein said performance modeling and forecasting module further comprises:

generating means for generating said network control model in accordance with a control relationship; and forecasting means for forecasting the performance of said network by forecasting a new performance as the result of application of said control relationship to said data.

16. The system as recited in claim 12, wherein said regional network scanning module comprises:

polling means for polling the one or more cells for said performance data;

transmission means for transmitting said data to a central location in response to said polling means.

17. The system as recited in claim 16, wherein said regional network and scanning module comprises:

spawning means for spawning a thread for each of the one or more cells, said thread to perform said polling means and collecting means.

18. The system as recited in claim 17, wherein said spawning means comprises:

first generating means for generating an A-matrix;

second generating means for generating a B-matrix;

setting means for setting a temporary vector equal to AX+BY+C, where X is a vector corresponding to said data, Y is a vector corresponding to previous estimates of the performance of the network, and C is a vector of constants operator actions; and updating means for updating a forecast of the performance of the network by adding said temporary vector to a previous estimate of the performance of the network.

19. The system recited in claim 18, wherein said spawning means further comprises:

repeating means for repeatedly applying said first and second generating means, said setting means, and said updating means over a history of forecasts; and storing means for appending a new forecast, produced by said repeating means, to said history.

* * * * *